United States Patent Office 3,761,325
Patented Sept. 25, 1973

3,761,325
METHOD FOR INDUCTIVELY HEATING AND QUENCHING ELONGATED WORKPIECES
Norbert Raymond Balzer, Parma, Ohio, assignor to Park-Ohio Industries, Inc., Cleveland, Ohio
Original application Dec. 14, 1970, Ser. No. 97,890. Divided and this application June 27, 1972, Ser. No. 266,638
Int. Cl. C21d 1/42
U.S. Cl. 148—153           3 Claims

ABSTRACT OF THE DISCLOSURE

A method and apparatus for inductively heating and quenching an elongated shaft element over substantially the entire length thereof which apparatus includes an elongated inductor housing having a generally U-shaped cross-section with an inductor loop imbedded longitudinally therein and an elongated quenching apparatus disposed in generally parallel side-by-side relationship. The shaft element is fed to a position directly below and coextensive with the inductor housing and inductor and then raised into inductive coupling therewith while being rotated about its longitudinal axis. Following heating, the element is transferred in like manner in communication with the quenching apparatus where it is quenched while being similarly rotated.

---

This is a division of application Ser. No. 97,890, filed Dec. 14, 1970, now Pat. No. 3,702,693.

This application pertains to the art of inductive heating and particularly to inductive heating of elongated shaft elements.

The invention is particularly applicable to induction heating of substantially the entire length of elongated generally cylindrical shaft elements and will be described with particular reference thereto; however, it will be appreciated that the invention has broader applications and may be employed for inductively heating and quenching elongated elements with other than generally cylindrical cross-sectional configurations over less than substantially their entire length.

Heretofore, the most common method of heating and quenching an elongated shaft element over substantially the entire length thereof has included moving the shaft longitudinally through an inductor and adjacent quenching unit. This prior method has been quite successful and is widely used. However, recently, it has been suggested to use an elongated inductor extending substantially the length of the shaft to thereby heat the entire shaft length simultaneously without the need for scanning. The present invention is directed towards this recent development. In using the elongated inductor idea, the actual handling of the shaft has been difficult since it is necessary to convey the shaft from a heating station to a quenching station. This presents problems in maintaining positive control over the element as it passes through the apparatus in order to assure rapid production output. More specifically, problems have been encountered in transferring an elongated shaft element from outside the apparatus into inductive coupling with the inductor, from the inductor to the quenching unit and finally from the quenching unit to an element removal area. Since with inductive heating, it is necessary to maintain a rather precise relationship between the shaft element and inductor, the loss of positive control thus far experienced has detracted greatly from the use of the elongated inductor concept.

The present invention contemplates a new and improved method and apparatus which overcomes the above referred problems and others and provides a new method and apparatus for inductively heating and quenching an elongated shaft element which increases productivity, provides homogeneous inductive heating and quenching and provides a method and apparatus readily adaptable for use with elongated shaft elements having various end-face sizes and configurations.

In accordance with the present invention, there is provided an apparatus for inductively heating and quenching an elongated shaft element having a longitudinal axis, the apparatus including an elongated inductor for inductively heating the element over substantially the entire element length and a quenching unit generally parallel and coextensive with the inductor for quenching the element over substantially its entire length following heating. The inductor and quenching unit define a generally horizontal workplane. Means for indexing the element along an element pass extending below and generally parallel with the workplane are provided to index the element between a first work station spaced below the inductor and a second work station spaced below the quenching unit. First means are provided for elevating the element from the first position into and out of an inductive heating coupling relationship with the inductor, for rotatably supporting the element for rotation about its axis and for rotating the element about its axis. Second means are provided for elevating the element from the second position into and out of a quenching relationship with the quenching unit, for rotatably supporting the element for rotation about its axis when the element is in a quenching relationship and for rotating the element when it is supported for rotation.

In acordance with another aspect of the present invention, a method for inductively heating and quenching an elongated shaft element is provided which comprises the steps of:

Elevating the element from a first position along an element pass into inductive coupling relationship with an elongated inductor;

Rotating the element about its longitudinal axis while the element is in the inductive coupling relationship;

Lowering the element back to the first position on the element pass;

Indexing the element along the pass into a second position adjacent the first position and spaced below an elongated means for quenching extending generally parallel to and coextensive with the inductor;

Elevating the element from the second position into a quenching relationship with the quenching means;

Rotating the element about its longitudinal axis while the element is in the quenching relationship; and Lowering the element from the quenching relationship into the second position.

The principal object of the present invention is the provision of a method and apparatus for inductively heating and quenching an elongated shaft element over substantially the entire length thereof.

Another object of the present invention is to provide a method and apparatus for heating and quenching an elongated shaft element which has at least one flanged end of a substantially larger cross-sectional area than the remainder of the element.

Another object of the present invention is the provision of a method and apparatus to decrease the production time required for innuctively heating and quenching an elongated shaft element.

Still another object of the present invention is the provision of a method and apparatus for providing positive control of an elongated shaft element as it is transferred to an inductive heating coupling relationship with an inductor and subsequently transferred to a quenching relationship with a quenching unit.

The invention may take physical form in certain parts and arrangements of parts, a preferred embodiment of which will be described in detail in this specification and illustrated in the accompanying drawings which form a part hereof and wherein.

Figure 1:
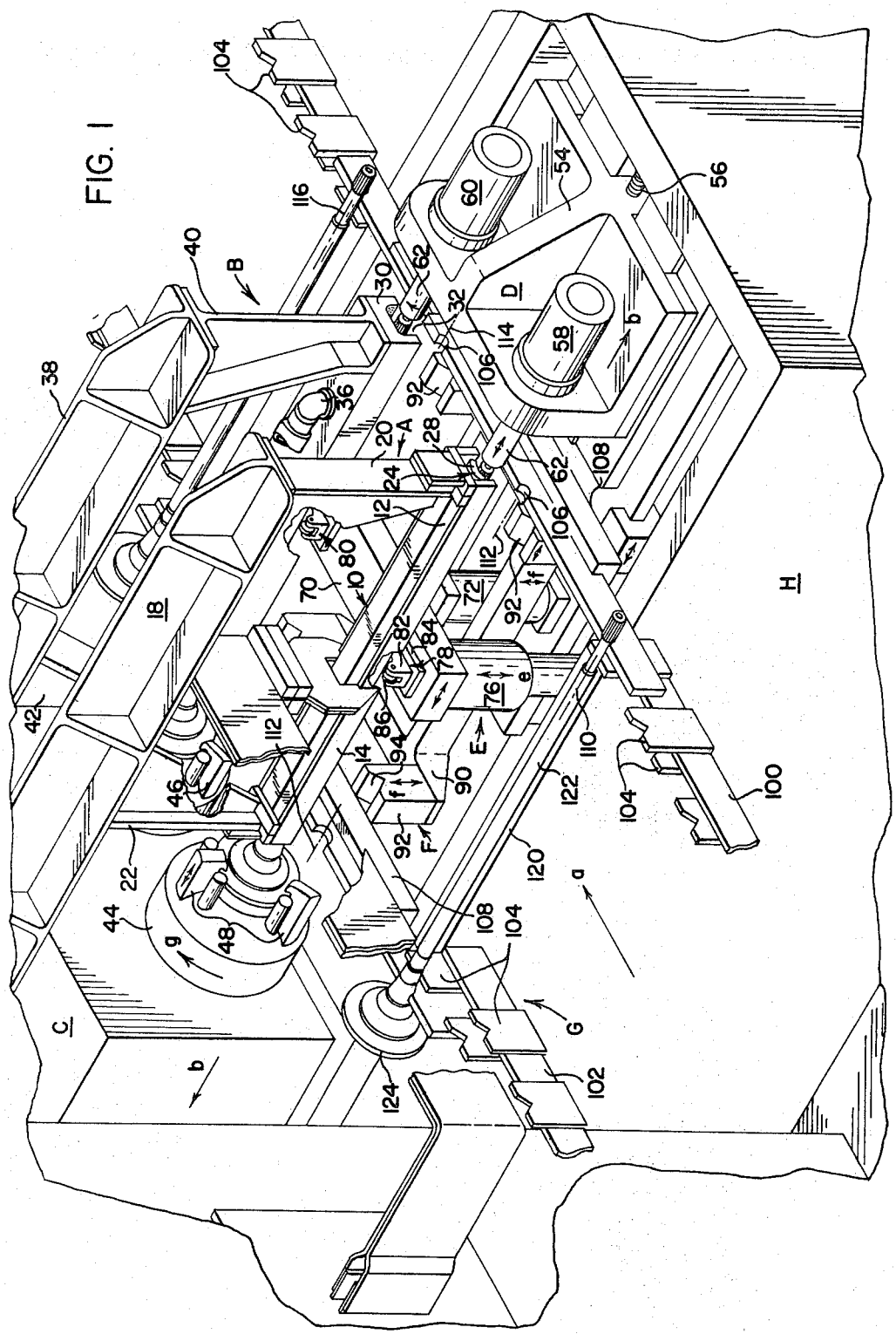
FIG. 1 shows a perspective view of the apparatus of this invention.

Referring now to the drawings, wherein the showings are for the purposes of illustrating the preferred embodiment of the invention only and not for purposes of limiting the same, the figures show an inductor unit A and queching unit B in spaced apart parallel side-by-side relationship. The apparatus includes head stock C and tail stock D for maintaining elongated shaft elements in a predetermined desired position and rotate the same about their longitudinal axes. Lateral restraints E are used to longitudinally support the elements after they have been raised in position relative to inductor unit A and quenching means B by V-elevator F. Shuttle unit G is employed to process the elements through the apparatus and framework H provides convenient means whereby the several components may be brought together into a single unit.

Figure 2:
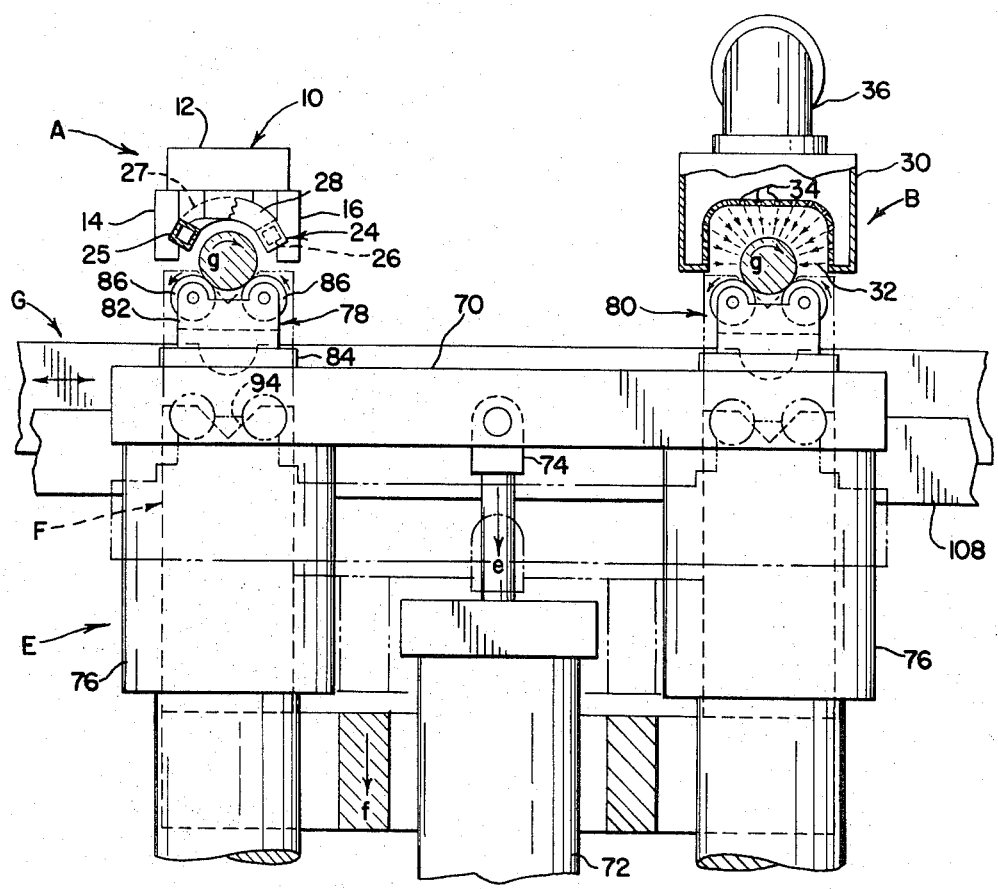
FIG. 2 is a cross-sectional view through the apparatus shown in FIG. 1 showing in particular the inductor and quenching arrangement.

Referring more specifically to both FIGS. 1 and 2, inductor unit A comprises an elongated inductor housing 10 comprised of a top portion 12 and side portions 14, 16. Housing 10 is suspended in a generally horizontal position through use of mounting bracket 18 extending from apparatus framework H and front mounting bracket 20 and rear mounting bracket 22 extending between bracket 18 and housing 10. The construction of housing 10 provides an elongated channel area opening in a generally downward direciton. Imbedded into top portion 12 and side portions 14, 16 is an inductor generally designated 24. Inductor 24 is comprised of legs 25, 26 extending along side portions 14, 16 and end legs 27, 28 interconnecting legs 25, 26 at the extremities of top portion 12 and side portions 14, 16 whereby a generally closed loop is formed. As can best be seen in FIG. 2, legs 25, 26, 27 and 28 are exposed to the elongated channel area in order that they may be immediately adjacent an elongated shaft element brought into proximity therewith to effect inductive heating coupling relationship. Means for providing a source of high frequency electrical current of the type generally associated with inductive heating and not shown in the drawings is provided for loop 24 and cooling means for inductor housing 10 of the type generally associated with inductive heating may also be included. When high frequency electrical current is applied to loop 24, magnetic flux is generated primarily between legs 25, 26 substantially over the length of housing 10 to effect inductive heating of an elongated shaft element in a coupling relationship therewith.

Quenching unit B is comprised of elongated quenching unit housing 30 which defines an elongated quenching fluid supply chamber. One side of housing 30 includes an elongated generally U-shaped channel area 32 of sufficient breadth to receive the elongated shaft element longitudinally therealong. A plurality of quenching fluid outlet passages 34 are included along the entire periphery of chamber area 32. Quenching fluid inlet 36 interconnects a quenching fluid supply source, such as for example, a water tap, with housing 30. Quenching fluid supplied to housing 30 is dispensed along the entire length of the housing to the channel area via the plurality of fluid outlet passages. Housing 30 is disposed generally horizontal, parallel to and generally coextensive with inductor housing 10. This is accomplished by mounting bracket 38 extending outwardly from apparatus framework H and front mounting bracket 40 and rear mounting bracket 42 interconnecting bracket 38 and housing 30.

Head stock C includes two spindles extending generally horizontally outwardly therefrom having mounted thereon workpiece gripping chucks 44, 46. It is to be understood that head stock C includes the necessary gearing and drive means necessarily requisite for rotationally driving the spindles and chucks mounted thereto in the desired direction. This equipment is not shown in the drawings and does not form a part of the subject invention. The head stock further includes means for moving either the entire head stock body or the spindles and chucks in a generally horizontal direction towards and away from tail stock D. Chucks 44, 46 are the type known in the art and include a plurality of fingers or jaws 48 which are adjustable from an open to a closed position in order to grip the flanged end portion of an elongated shaft element in a desired manner.

Tail stock D includes frame member 54 mounted to apparatus frame H and is adjustable towards and away from head stock C by any convenient means. In the preferred embodiment of the subject invention, these means comprise a worm 56 and worm wheels associated with frame 54 and apparatus frame H which are not shown. Frame member 54 has mounted thereon supporting and centering means 58, 60 which extend generally coaxial with chucks 44, 46. Each supporting and centering means includes nose portion 62 also adjustable towards and away from head stock C by conventional means.

Lateral restraint E includes a generally horizontal frame member 70 disposed so as to be moved from a first lower position to a second raised position. Lift cylinder 72 is interconnected with frame member 70 by clevis 74 using known means, such as for example, a clevis pin arrangement. Cylinder 72 may be of several types, however, in the preferred embodiment, a pneumatic cylinder is utilized. Near the extremities of frame member 70 are lift balance members 76. These members may comprise spring biasing means or fluid cylinders and are utilized to assure accurate vertical lift of the restraint unit. On the top surface of frame member 70 immediately opposite lift balance member 76 are shaft element supports generally designated 78, 80. As these means are identical, only shaft element support 78 will be described, it being understood that support 80 is identical thereto. Support 78 includes roller housing 82 affixed by any convenient means to intermediate mounting plate 84 which itself is affixed by convenient means to frame member 70. Roller housing 82 is adapted to receive two parallel spaced apart roller elements 86 which are rotatable coextensive with spindles 44, 46 and define a shaft element supporting groove generally coextensive with the channel portions of housings 10, 30. Shaft element supports 78, 80 provide lateral support for shaft elements being heated or quenched so that during heating and quenching, the elements are maintained in a relatively straight condition.

V-elevator F includes a generally rectangular framework designated 90. At each corner of framework 90 there is located a V-block 92. Each V-block includes therein a V-slot 94 generally coextensive with chamber areas of housings 10, 30. It should be noted here, and as best shown in FIG. 2, that the elongated channel areas in housings 10, 30; shaft element support roller means 78, 80; and, V-blocks 92 are all in general vertical alignment with each other. V-elevator F further includes means for vertically raising and lowering framework 90 in association with shuttle unit G and support roller means 78, 80. These means (not shown) may comprise any convenient means such as for example pneumatic cylinders.

Shuttle unit G is comprised of front shuttle arm bar 100 and rear shuttle arm bar 102. Each bar 100, 102 includes a plurality of shaft element locating gages 104 extending along the length thereof. Immediately beneath and in horizontal alignment with the channel portions of housings 10, 30, these gages are replaced by oppositely disposed arcuate relief areas 106 sufficient to support therebetween an elongated shaft element. Shuttle arm bars 100, 102 are interconnected for generally horizontal reciprocal movement generally transverse to the channel areas of housings 10, 30. Each arm is supported in a channel guide means 108 to aid in maintaining this transverse directional relationship. The driving mechanism for effecting this reciprocal movement may be of the type generally associated with shuttle units and does not form a part of the present invention. The oppositely disposed relief areas 106 form work stations 110, 112, 114 and 116 which are equidistantly spaced apart a distance equal to the dimension between the centerlines of housing 10, 30.

For describing the operation of the subject apparatus and method, it is assumed that a plurality of automobile axle shafts 120 are desired to be heated and quenched. Each shaft includes an elongated generally cylindrical body portion 122 and an enlarged flanged area 124 at one end. These axle shafts may be moved from a prior operation to the subject apparatus by means of shuttle unit G in the direction indicated *a*. When a shaft 120 reaches position 110 as shown in FIG. 1, it is in the first stage of the apparatus. Before the shaft may be indexed forward, it is necessary that head stock C and tail stock D be moved away from each other in the direction generally designated *b*. Lateral restraint E and V-elevator should both be moved to their vertically lowered positions designated *e, f* respectively. Shuttle unit G may now be moved forward so that work station 110 is immediately beneath the channel area of inductor housing 10. The V-elevator is then vertically raised from its lowered position to lift axle shaft 120 from its nested position in arcuate slots 106 of station 110 by V-slots 94 in V-blocks 92 to a position coextensive with the channel area of inductor housing 10 and coaxial with chuck 44 and supporting and centering means 58. Head stock C and tail stock D are moved towards each other, opposite direction *b*, until chuck 44 engages flanged area 124 and nose 62 of supporting and centering means 58 engages the opposite end of axle shaft 120. Simultaneous with this engagement, fingers 48 of chuck 44 are closed around flanged area 124. V-elevator F is then again moved in direction *f* to its lowest position. Simultaneous therewith lateral restraint E is raised opposite direction *e* so that, as best shown in FIG. 2, rollers 86 of roller housing 82 laterally support the workpiece. Inductor 24 may then be energized to begin the inductive heating process and the spindle containing chuck 44 may be energized to rotate axial shaft 120 in direction *g*. By rotating the shaft element during heating, consistent heating over substantially the entire shaft portion 122 is assured. The length of heating time, of course, depends entirely upon the diameter of shaft portion 122 as well as the temperature to which it is desired to be heated.

During heating, shuttle unit G is to be moved opposite direction *a* so that a new shaft element may be placed on work station 110 and work station 112 is vertically below inductor housing 10. Following heating, fingers 48 of chuck 44 are opened. Head stock C and tail stock D may then be moved in direction *b* away from engagement with axle shaft 120. Lateral restraint E is then used to lower the axle shaft into work station 112 on shuttle arm bars 100, 102. The apparatus is now in the initial condition so that by indexing shuttle unit G forward in the direction of *a*, work station 110 is again immediately below inductor housing 10 and work station 112 is immediately below quenching unit housing 30. The above described steps are raising V-elevator F and lateral restraints E are again repeated, and this time, one shaft 120 is inductively heated while another simultaneously quenched. Following this heating and quenching, and following the same operational steps as hereinabove described, the first axle shaft will be received in work station 114 and the second element will be received in work station 112. This process is repeated until each shaft element is received at work station 116 for movement to the next production operation.

It will be understood that the component parts of the subject apparatus may be made adjustable in order to compensate for varying lengths of shaft elements as well as varying diameters. Further, depending on the type of elongated shaft element to be processed, that is, whether it includes one, two or no flanged areas, chucks 44, 46 and supporting and centering means 58, 60 may be altered accordingly.

The invention has been described with reference to the preferred embodiment. Obviously, modifications and alterations will occur to others upon the reading and understanding of this specification. It is my intention to include all such modications and alterations in so far as they come within the scope of the appended claims or the equivalence therewith.

Having thus described my invention, I now claim:

1. A method for inductively heating and quenching an elongated shaft element having a longitudinal axis over substantially the entire length thereof, said method comprising the steps of:
    (a) elevating said element from a first position along an element pass into inductive coupling relationship with an elongated inductor;
    (b) rotatably supporting said element relative to said axis;
    (c) rotating said element about said axis while said element is in said inductive coupling relationship with said inductor whereby said element is heated over substantially the entire length thereof;
    (d) lowering said element to said first position on said pass;
    (e) indexing said element along said pass into a second position adjacent said first position and spaced from elongated means for quenching extending generally parallel and coextensive with said inductor;
    (f) elevating said element from said second position into a quenching relationship with said quenching means;
    (g) rotatably supporting said element for rotation about said axis;
    (h) rotating said element about said axis while said element is in said quenching relationship with said elongated quenching means whereby said element is quenched over substantially the entire length thereof; and,
    (i) lowering said element from said quenching relationship into said second position.

2. The method as defined in claim 1 wherein said supporting of said element for heating and quenching comprises the step of placing said element coaxially between element and engaging devices and drivingly rotating said devices.

3. The method as defined in claim 1 further including the step of laterally supporting said element during rotation in said inductive coupling relationship and during rotation in said quenching relationship.

References Cited
UNITED STATES PATENTS 3,648,995    3/1972    Seyfried et al. _____ 148—153

RICHARD O. DEAN, Primary Examiner

U.S. Cl. X.R.

148—150